United States Patent Office 2,806,860
Patented Sept. 17, 1957

2,806,860
EPOXYALKYL SUCCINIC ANHYDRIDES

Benjamin Phillips, Paul S. Starcher, and Donald L. Heywood, Charleston, W. Va., assignors to Union Carbide Corporation, a corporation of New York No Drawing. Application July 20, 1955,
Serial No. 523,374

6 Claims. (Cl. 260—346.8)

This invention relates to corrosion inhibitors suitable for use as anti-corrosion agents for synthetic lubricants. More particularly, this invention has for one of its objects the provision of a new series of synthetic organic chemicals particularly suitable for use as corrosion inhibitors for synthetic lubricants and for another of its objects lubricant compositions containing the corrosion inhibitors.

The particular polyoxyalkylene fluids referred to are the addition products formed by the reaction of either a dihydroxy or a monohydroxy aliphatic alcohol with a mixture of ethylene oxide and 1,2-propylene oxide in which the ratios of the respective oxides are from about 25–75 to 75–25. With a dihydroxy alcohol starting material, polyoxyalkylene diols are productd by this reaction, and when a monohydroxy alcohol constitutes the starter, the resulting products are composed of monohydroxy aliphatic monoethers of the polyoxyalkylene chains as indicated. In both instances these products are viscous liquids of relatively high average molecular weight, and they are actually complex mixtures of either the monohydroxy or dihydroxy derivatives (dependent upon the starter compounds) having polyoxyalkylene chains of different lengths. By suitable modification of the reaction conditions, and the quantities of added mixed alkylene oxides, products of increasing average molecular weights and viscosity can be produced, to suit any particular use desired for the fluids.

For a further and more detailed description of the fluid compositions of the invention, reference is made to U. S. Patents 2,425,755 and 2,425,845, issued August 19, 1947, in the names, respectively, of F. H. Roberts et al., and W. J. Toussaint et al. The lower-numbered patent discloses the monohydroxy oxyethylene-oxy 1,2-propylene alkyl monoether products, as formed by a reaction starting with a monohydroxy alcohol, and the other patent covers the oxyethyleneoxy 1,2-propylene diol addition products, made from a starter of ethylene glycol or other dihydroxy alcohol.

As already indicated, these polyoxyalkylene glycol fluids are known to have certain water solubility, and in various uses, such as lubricants for wire drawing and other metal-forming operations, the fluids are often diluted with from five to ten or more parts of water. In other applications the fluids may be used in humid atmospheres or under other conditions where they may readily adsorb substantial quantities of water. Corrosion-inhibitor additives are therefore desirable in these fluids when used as indicated, and it is an object of this invention to provide improved inhibitor compositions for retarding or repressing the corrosive effect of water as contained in these polyoxyalkylene glycol fluids.

This invention provides a group of organic compounds which are soluble and compatible with these synthetic lubricants at high and low temperatures which inhibit the corrosive action of these lubricants when dissolved therein in small quantities.

The group of compounds which accomplish the objects of this invention are the epoxyalkyl succinic anhydrides and can be represented by the following structural formula:

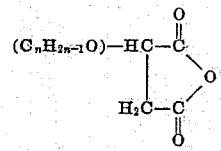

wherein the group ($C_nH_{2n-1}O$) represents an epoxyalkyl group composed of carbon, hydrogen and one oxygen atom which is attached to vicinal carbon atoms, said epoxyalkyl group containing from three through twelve carbon atoms.

The compounds of this invention are prepared by reacting peracetic acid and an alkenyl succinic anhydride, as illustrated in the case of dodecenylsuccinic anhydride, by the following equation:

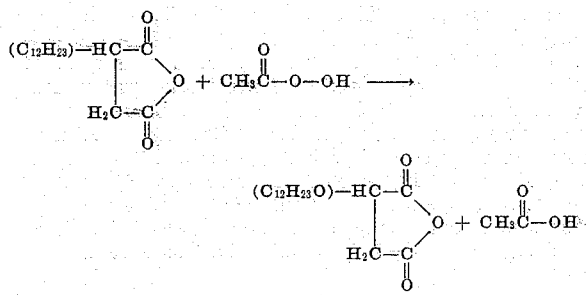

The process of this invention is accomplished by reacting an alkenylsuccinic anhydride and peracetic acid at a temperature in the range of from about 10° C. to 140° C. More particularly, the process of this invention comprises reacting an alkenylsuccinic anhydride and peracetic acid at a temperature in the range of from 10° C. to 140° C. and preferably at a temperature in the range of from 25° C. to 75° C. To insure complete epoxidation of the alkenylsuccinic anhydride, the reaction can be carried out in a slight molar excess of peracetic acid if desired. In carrying out the process of this invention, the alkenylsuccinic anhydride is charged, in any convenient manner, to a reaction vessel whereupon peracetic acid in acetone is added over a period of time with stirring and cooling, if necessary. After the addition of the peracetic acid in acetone solution is complete, the reaction mixture is allowed to stand or heated until the reaction is complete. The titration of a sample for peracetic acid will indicate the extent of the reaction. After the reaction is substantially complete, the crude reaction product is worked up by removing the by-product acetic acid, solvent and any excess peracetic acid. These products can be removed azeotropically by distillation with ethylbenzene or other suitable azeotroping agent. After these low-boiling components have been stripped from the crude reaction product, the epoxide can be recovered by extraction, by crystallization, by precipitation with a non-solvent or by distillation. The lower molecular weight compounds may be obtained as pure distillates whereas the higher molecular weight products are accepted as residue products.

The following examples will illustrate the practice of the invention:

EXAMPLE 1

*Preparation of epoxydodecylsuccinic anhydride*

To 159.6 grams (0.6 mole) of dodecenylsuccinic anhydride prepared from triisobutylene and maleic anhydride and having a melting point of 139° C.–142° C., were added 290 grams of a 23.6 percent peracetic acid-acetone solution containing 0.9 mole of peracetic acid at a temperature of 40° C. over a period of one hour and 20 minutes. After an additional four hours at 40° C., titration for peracetic acid indicated that 92.7 percent of the theoretical amount of peracetic acid had been consumed. The reaction mixture was then refluxed with ethylbenzene and all low boiling components were removed. Final heating at 100° C. and 8 mm. of Hg pressure afforded 168 grams of epoxydodecylsuccinic anhydride, a viscous yellow product, which crystallized slowly on standing. The product was white crystalline solid melting at 147° C.–150° C.

EXAMPLE 2

*Preparation of epoxybutylsuccinic anhydride*

To 385 grams (2.5 moles) of butenylsuccinic anhydride prepared from $C_4$ mixed butenes and maleic anhydride were added 90.2 grams of 99 percent ethyl acetate. To a stirred slurry of this were added 1041 grams of a 21.9 percent peracetic acid-ethyl acetate solution containing 3.0 moles of peracetic acid at a temperature of 40° C. over a period of one hour and 50 minutes. After an additional three hours at 40° C., titration for peracetic acid indicated that 90.4 percent of the theoretical amount of peracetic acid had been consumed, at which time a large quantity of white solid was evident in the reaction mixture. The reaction mixture was fed dropwise to a kettle of refluxing ethylbenzene at 35 mm. Hg pressure and all low boiling components were removed. Final heating at 60° C. and 3 mm. Hg pressure afforded 473 grams of viscous yellow residue product that crystallized slowly on standing. A sample of the product recrystallized from ethyl acetate gave an observed melting point of 186° C.–190° C. and analysed 80.1 percent epoxybutylsuccinic anhydride.

In a similar manner, additional epoxides such as epoxyoctyl succinic anhydride, epoxynonyl succinic anhydride, epoxyheptyl succinic anhydride and epoxyhexyl succinic anhydride can be readily obtained by reacting peracetic acid and the corresponding alkenylsuccinic anhydride.

What is claimed is:

1. An epoxyalkylsuccinic anhydride characterized by the structural formula:

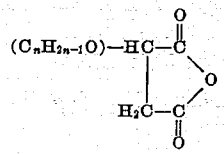

wherein the group $(C_nH_{2n-1}O)$ represents an epoxyalkyl group composed of carbon, hydrogen and one oxygen atom attached to vicinal carbon atoms, said epoxyalkyl group containing from three through twelve carbon atoms.

2. Epoxybutylsuccinic anhydride.
3. Epoxyhexylsuccinic anhydride.
4. Epoxyheptylsuccinic anhydride.
5. Epoxyoctylsuccinic anhydride.
6. Epoxydodecylsuccinic anhydride.

References Cited in the file of this patent

UNITED STATES PATENTS

| | | |
|---|---|---|
| 2,124,628 | Moser | July 26, 1938 |
| 2,133,734 | Moser | Oct. 18, 1938 |
| 2,371,142 | Barnum | Mar. 13, 1945 |
| 2,741,597 | Oosterhaut | Apr. 10, 1956 |